United States Patent [19]

Tuckey

[11] Patent Number: 4,780,063

[45] Date of Patent: Oct. 25, 1988

[54] VEHICLE FUEL PUMP HAVING A NOISE-REDUCTION JACKET

[75] Inventor: Charles H. Tuckey, Cass City, Mich.

[73] Assignee: Walbro Corporation, Cass City, Mich.

[21] Appl. No.: 106,541

[22] Filed: Oct. 9, 1987

[51] Int. Cl.⁴ ........................ F04B 35/04; F16M 13/00

[52] U.S. Cl. .................................... 417/360; 417/363; 417/410; 248/604; 137/565; 137/590

[58] Field of Search ............... 417/313, 360, 363, 366, 417/423 L; 248/603, 604; 181/198, 207; 137/590, 565

[56] References Cited

U.S. PATENT DOCUMENTS

| | | | |
|---|---|---|---|
| 2,108,734 | 2/1938 | Van Sciver | 417/363 |
| 2,116,099 | 5/1938 | Chamberlain | 417/423 L |
| 3,014,623 | 12/1961 | Horn et al. | 417/410 X |
| 3,143,284 | 8/1964 | Lingsjo et al. | 417/363 |
| 4,212,600 | 7/1980 | Otto et al. | 417/360 |
| 4,218,196 | 8/1980 | Ohnishi | 417/366 X |
| 4,231,719 | 11/1980 | Ringwald et al. | 417/366 |
| 4,306,844 | 12/1981 | Otto et al. | 417/363 X |
| 4,309,155 | 1/1982 | Heinz et al. | 417/363 X |
| 4,362,476 | 12/1982 | Kremmner et al. | 417/363 X |
| 4,447,192 | 5/1984 | Tuckey | 417/366 X |
| 4,569,637 | 2/1986 | Tuckey | 417/360 |
| 4,590,964 | 5/1986 | Beardmore | 417/363 X |
| 4,591,319 | 5/1986 | Takahashi et al. | 417/360 |

FOREIGN PATENT DOCUMENTS

| | | | |
|---|---|---|---|
| 3514594 | 10/1986 | Fed. Rep. of Germany | 417/313 |
| 0168256 | 9/1984 | Japan | 417/363 |
| 72864 | 4/1986 | Japan | 417/363 |
| 852895 | 11/1960 | United Kingdom | 417/363 |
| 2094443 | 9/1982 | United Kingdom | 137/846 |

*Primary Examiner*—Paul F. Neils

*Attorney, Agent, or Firm*—Barnes, Kisselle, Raisch, Choate, Whittemore & Hulbert

[57] ABSTRACT

An electric in-tank fuel pump for vehicles which is provided with a noise-reduction jacket of relative soft material spaced from the pump housing by internal projections on the jacket which contact the pump housing. An extended skirt on one embodiment serves to collect vapor which rises in the jacket to maintain a low liquid fuel level around the pump. A quick connect-disconnect from the pump to a fuel line with an integral unidirectional valve is provided to maintain fuel line pressure when the pump is not operating. Also, an inlet unidirectional valve is provided to prevent fuel from siphoning out of the pump.

3 Claims, 2 Drawing Sheets

VEHICLE FUEL PUMP HAVING A NOISE-REDUCTION JACKET

REFERENCE TO RELATED APPLICATION

Reference is made to my copending application, Ser. No. 049,536, filed May 14, 1987, entitled "Quick Disconnect Pulse Modulation Sleeve".

FIELD OF INVENTION

In-tank fuel canisters with included electric fuel pump and noise reduction features.

BACKGROUND AND OBJECTS OF THE INVENTION

Electric fuel pumps located in vehicle fuel tanks have supplanted the older fuel systems in which vacuum was used to pull fuel from the fuel source to the carburetor. This is especially true in fuel systems utilizing fuel injection. These fuel pumps are operated at high speeds and in most cases utilize positive displacement type pumps which inherently have a pulsating system. These pumps may have pressure range from 12 pounds per square inch (psi) to 75 psi. Especially in passenger vehicles, it is desirable to have the fuel pumps operate in such a manner that passengers are not conscious of any pulsating noise or vibration. Since most fuel tanks are mounted in the rear of the vehicle, it is important that passengers in the rear seats are not disturbed by the pump operation.

Accordingly, there have been many efforts to reduce pump noise and vibration. Various mounting devices and shielding walls have been suggested as illustrated in the disclosures of the following U.S. patents:

Horn et al, U.S. Pat. No. 3,014,623 (1961)
Ringwald et al, U.S. Pat. No. 4,231,719 (1980)
Otto et al U.S. Pat. No. 4,306,844 (1981)
Beardmore U.S. Pat. No. 4,590,964 (1986)
Tuckey U.S. Pat. No 4,569,637 (1986)
Takahashi et al U.S. Pat. No. 4,591,319 (1986)

It is an object of the present invention to provide an electric fuel pump combination which achieves a significant lowering of vibration and pulse noise while providing an inexpensive mounting system.

It is a further object to provide a pump mounting combination which is versatile in adaptation to varying tank sizes and useful in a wide range of pump ratings as to operating pressures.

It is a further object to provide a pump mounting unit which maintains pump pressure in the fuel lines during a shut-off period and thus reduces delay time in a restart cycle due to priming time.

Further objects and features of the invention will be apparent in the following description and claims in which the principles of the invention are set forth together with details to enable persons skilled in the art to practice the invention, all in connection with the best modes presently contemplated for the invention.

BRIEF DESCRIPTION OF THE DRAWINGS

Drawings accompany the disclosure and the various views thereof may be briefly described as.

DETAILED DESCRIPTION OF THE INVENTION AND THE MANNER AND PROCESS OF USING IT

Figure 1:
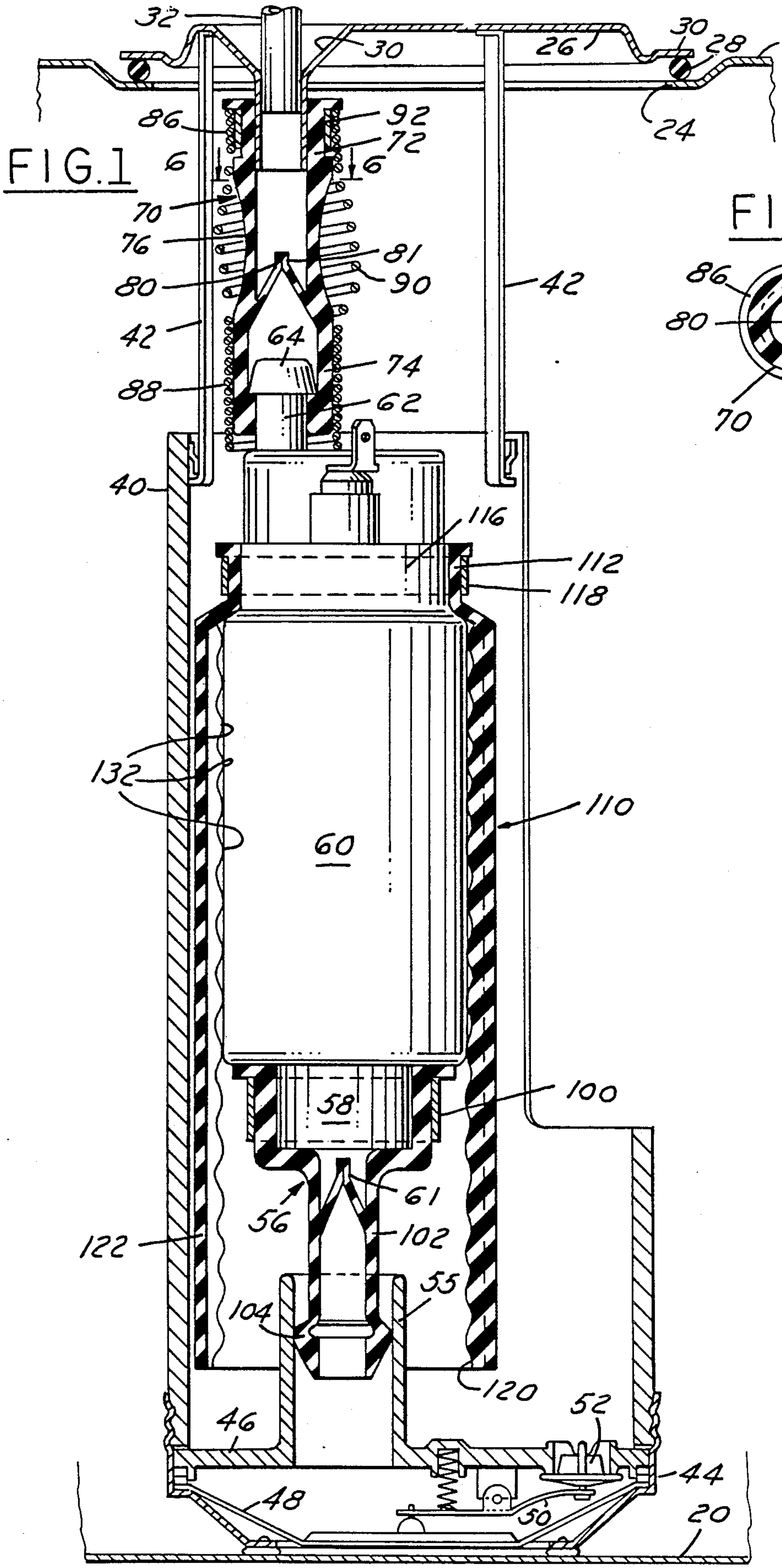
FIG. 1, an assembly drawing showing a tank-mounted pump with one embodiment of the present invention.

With reference to the drawings, in FIG. 1, a fuel tank bottom 20 is illustrated and a fuel tank top surface 22 which has an opening 24 in which is sealingly mounted a canister top and tank closure 26. An annular seal 28 is provided between a flange 30 on the cover and the periphery of the opening 24.

A small depression 30 is provided on the cover 26 and a fuel line 32 has an end 34 projecting into and sealed in relation to the depression 30. Within the tank and below the cover 26 is a fuel canister 40 mechanically associated with the cover by suspension legs 42. The canister has a screw-on base ring 44 which rests on the bottom 20 of the tank. A base plate 46 supports a mesh diaphragm 48 which, through a spring biased lever 50 controls the opening and closing of a valve 52 cooperating with a valve seat in the base plate 46. The function of this diaphragm and valve is fully described in my copending application, Ser. No. 928,184, filed Nov. 7, 1986.

The base plate 46 has an upstanding boss which has a sealing fit with a pump inlet adapted 56 clamped around a pump inlet 58 of an electric fuel pump 60 suitably supported in the canister 40. A one-way valve 61 is provided in the adaptor 56. The pump 60 has a top outlet nipple 62 with an annular lip 64.

The connector 70 is a molded tubular part formed of a flexible rubber-like material which is impervious to and resistant to hydrocarbon fuels. Suitable synthetic rubber or plastics can be used such as fluorocarbon or fluorosilicone which are dimensionally stable in the presence of hydrocarbons.

The top portion 72 of the connector has a cylindrical shape with an entry passage to fit around the fuel line conduit end 34. The bottom portion 74 of the connector is also cylindrical in shape with a stepped passage which provides a shoulder to underlie the lip 64 of the pump outlet 62.

Figure 6:
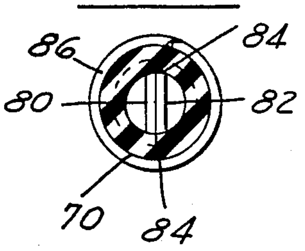
FIG. 6, a small section of an outlet sleeve taken on line 6—6 of FIG. 1.

Between the top the bottom portions 72, 74 is a reduced wall section 76 with thinner wall thickness which increase the flexibility of this mid-section. At the lower end of the mid-section where it joins the lower portion 74 is formed a one-way valve of the general nature of a duckbill valve with two flap valve elements 80, 82 which lie adjacent each other as illustrated in the sectional view of FIG. 6. The valve elements 80, 82 are integral at the ends 84 with the annular side walls of the reduced section 76. With this construction if the reduced section 76 is expanded outwardly, the valve elements will be drawn tighter together and stressed to increase the pressure required to pass between them.

While the lip 64 and shoulder on the inner recess of the portion 74 of the connector will resist dislocation of the connector, it is desirable to have a special spring to insure against dislodgment of the connector and to serve also other functions. As shown in FIG. 1, a coil spring has close coiled ends at the top 86 and bottom 88 which fit snugly around the sections 72 and 74 of the connector. Between these sections, the spring is bowed out with wider spacing at the central portion 90. At the top a circular clamp 92 is utilized to secure the spring around the conduit end 34.

It will be noted that the adaptor or coupling unit 56 is secured to the pump inlet by an encircling clamp 100. The lower end of the adaptor narrows to a tube 102 in which the duckbill valve 61 is formed. The lower end of the adaptor has a bulbous portions 104 which has a sealing slip fit in the upstanding boss 55 so that a vertical adjustment is permitted to accommodate to varying vertical dimensions. The valve 62 opens readily to allow in-flow of fuel to the pump but closes when the pump is shut off to retain the pressure in the pump and thus avoid or reduce priming time when the pump is restarted. The pump can be an electrically operated rotary pump as illustrated in U.S. Pat. No. 4,596,519 issued June 24, 1986 and in my copending application, Ser. No. 860,866, filed May 8, 1986, and now issued as U.S. Pat. No. 4,697,995 on Oct. 6, 1987.

Figure 2:
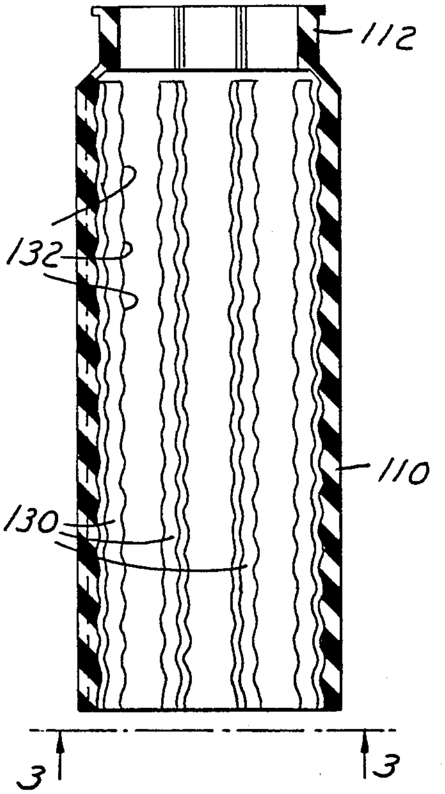
FIG. 2, a sectional view of a pump jacket utilized in FIG. 1.
Figure 3:
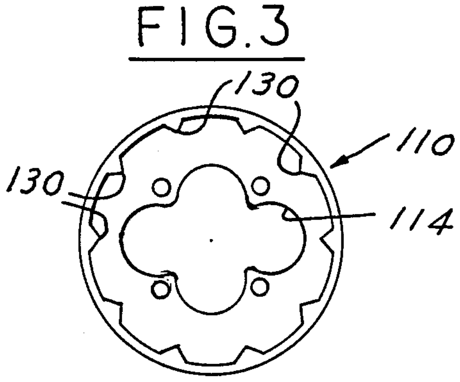
FIG. 3, an end view taken on line 3—3 of FIG. 2.

In accordance with the present invention, a pump jacket 110 encompasses the housing of pump 60. The top end 112 has a multi-lobe shape illustrated at 114 in FIG. 3 which surrounds the outlet end 116 of the pump in a tight fit with an appropriately shaped clamp 118 insuring a secure joint. The jacket 110 is generally cylindrical in shape and extends downwardly to an open end 120 so that a skirt portion 122 extends below the pump inlet and almost to the bottom of the tnak. The inside surface of the jacket 110, as illustrated in FIGS. 1, 2 and 3, has a plurality of circumferentially spaced longitudinally extending ribs 130 which are rippled in profile to provide protrusions 132 to have spaced contact with the metal shell of the pump 60 as shown especially in FIG. 1. The jacket is formed of a relatively soft material such as fluorocarbons or fluorosilicones which are stable in the presence of hydrocarbons. The general thickness of the jacket ranges from about 0.125" at the peaks of the contact protrusions to about 0.030" at the valleys between the longitudinal ridges. These dimensions can vary with material used.

The pumps used with these assemblies frequently have purge ports which allow vapor and the light ends of the fuel to escape the pump and thus avoid cavitation in the fuel progression. In the embodiment of FIG. 1, these gaseous vapors can escape into the interior of the jacket 110 and will rise in the jacket around the pump housing 60. This will keep the liquid level in the canister depressed in the area of the jacket and avoid liquid contact with the pump housing. This then is a factor in the reduction of noise transmission in addition to the insulating effect of the multiple point contact with the protrusions of the jacket interior surface and the spacing which results from the stand-off protrusions.

Figure 4:
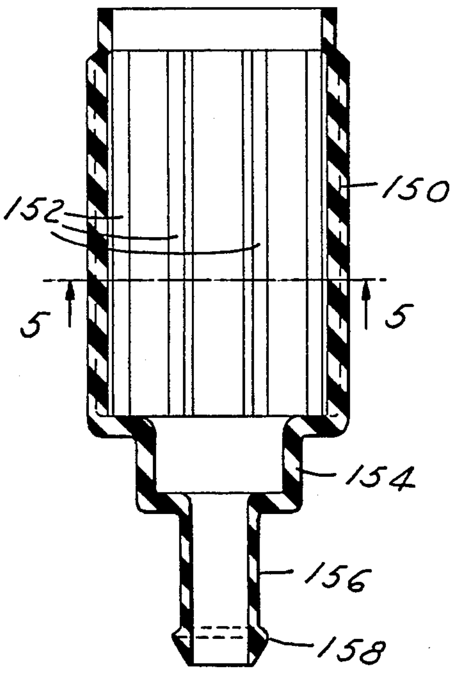
FIG. 4, a longitudinal sectional view of a modified pump jacket.
Figure 5:
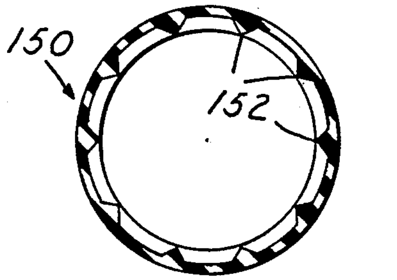
FIG. 5, a transverse sectional view on line 5—5 of FIG. 4.

In FIGS. 4 and 5, a modified jacket is illustrated which combines the basic concept of the jacket 110 previously described and the adaptor piece 56 of FIG. 1. In FIG. 4, the jacket 150 has a circular top opening to be clamped securely to a pump housing and the interior of the jacket has longitudinally extending ribs 152 with the apex of the triangular shape positioned to contact the pump shell. These ribs could also be undulated as in FIG. 1.

The lower end of the jacket 150 is stepped down at 154 to closely embrace the inlet end of a pump and reduced to a depending neck portion 156 with a bulbous end 158 to have a slip fit, as in FIG. 1, with an inlet collar 55.

COMBINED EFFECT OF THE COMBINATION OF FIG. 1

In FIG. 1, the connector 70 is a suspension unit for the pump outlet 62. The shoulder on nipple 62 engages the shoulder in the lower end 74 of the connector 70. The coil spring at 88 is closely coiled to reinforce the adaptor at 74 to insure the suspension contact of the shoulders. However, this coil spring can be pushed upwardly to relieve the circumferential restart at 74 and allow the pump to be removed. This can be characterized as a quick connect-disconnect function.

The adaptor suspension element 70 is also a pulse dampener over a large range of pressures. The thin intermediate section 76 will absorb pulses in lower pressures. As pressures increase, the walls thicken above and below the thin section and thus provide greater resistance to pulsations. The coil spring 90, enlarged in the mid-section, restrains the walls against over-ballooning. The check valve 80, 82 traps fuel under pressure in the fuel line and thus maintains the line pressure for immediate restart without a priming delay. The valve 61 also serves this function. The edges of the valve lips 80, 82 are integral with the walls of the adaptor so that as the wall expand, the lips are drawn closer together to insure positive closing. Should the material in the adaptor swell, the same effect will follow. The adaptor 70 has proved effective in a pump outlet pressure ranging from 12 to 75 pounds per square inch and has reduced pulsations by 50%.

The space insulation of the jacket attributable to the longitudinally extending ribs with spaced contact contributes materially to the reduction in noise output with as much as a 30% reduction. In addition, the vapor trap which keeps the liquid fuel out of the jacket insures this space insulation.

The embodiment in FIGS. 4 and 5 is adapted for use with any pump installation and provides the space insualting and minimal wall contact as previously described. A valve 61, as in FIG. 1, could also be included in the reduced neck portion 156.

What I claim is:

1. A fuel pump assembly for use with an in-tank fuel system in a vehicle which comprises an in-tank electric pump having an inlet end, an outlet end, and a generally cylindrical outer housing, a surrounding jacket sealed to one end of said housing formed of relatively soft resilient material having a plurality of circumferentially spaced longitudinally extending ridges with inner apices contacting said housing to serve to provide air gaps between the jacket and said housing, said longitudinally extending ridges being undulated to space the contact with said housing longitudinally as well as circumferentially.

2. A fuel pump as defined in claim 1 in which the other end of said jacket at the inlet end of said pump is stepped down in diameter to provide a slip neck portion to interfit with a pump inlet collar.

3. A fuel pump assembly for use with an in-tank fuel system in a vehicle which comprises an in-tank electric pump having an inlet end, an outlet end, and a generally cylindrical outer housing, a surrounding jacket sealed to one end of said housing formed of relatively soft resilient material having a plurality of circumferentially spaced longitudinally extending ridges with inner apices contacting said housing to serve to provide air gaps between the jacket and said housing, a tank cover removably mounted at the top of a fuel tank, a connector tube depending from said cover forming a fuel outlet, a flexible outlet adaptor having one end mechanically secured to said connector tube, a pump outlet tube secured in the other end of said outlet adaptor to suspend said pump and jacket in said fuel tank, a base inlet plate in said tank having an upstanding inlet tube, and a flexible fuel inlet adaptor on said pump having a portion slidingly and sealingly engaging the said base inlet tube.

* * * * *